United States Patent [19]

Johnson

[11] 4,294,507

[45] Oct. 13, 1981

[54] CONTROLLABLY DEFORMED ELASTIC WAVEGUIDE ELEMENTS

[75] Inventor: Mark Johnson, Ossining, N.Y.

[73] Assignee: International Business Machines Corporation, Armonk, N.Y.

[21] Appl. No.: 115,477

[22] Filed: Jan. 25, 1980

[51] Int. Cl.³ .............................................. G02B 5/14
[52] U.S. Cl. .............................. 350/96.13; 350/96.12; 350/96.18; 350/360
[58] Field of Search .............. 350/96.12, 96.13, 96.14, 350/96.15, 96.16, 96.18, 96.29, 359, 360

[56] References Cited

U.S. PATENT DOCUMENTS

| 4,106,848 | 8/1978 | Conwell et al. | 350/96.14 |
| 4,142,774 | 3/1979 | Wright | 350/96.12 |
| 4,162,118 | 7/1979 | Conwell | 350/96.13 |
| 4,182,543 | 1/1980 | Wied et al. | 350/96.13 |

OTHER PUBLICATIONS

J. Maher et al., "Elastomeric Optical Waveguide Modulators" in *Appl. Phys. Letts.*, vol. 29, No. 5, Sep. 1976.
D. Vahey et al., "Focal Characteristics of Spherical Geodesic Lenses for Integrated Optical Processing" IEEE Journal of Quant. Electr., vol. QE13, No. 4, Apr. 1977.

*Primary Examiner*—Stewart J. Levy
*Attorney, Agent, or Firm*—Ronald L. Drumheller

[57] ABSTRACT

An elastic two dimensionally guiding waveguide is controllably stretched between two or more different configurations, the different configurations being such that wave energy takes different paths through the waveguide at each of the two or more different configurations. The paths are different because wave energy which propagates along and between two parallel boundary surfaces or which follows a surface travels along a geodesic path and the geodesic path can be changed by stretchably deforming the surface shape in a suitable manner. In one embodiment an optically transparent sheet of rubber-like material is stretched into a depression or hole within a substrate using controlled pneumatic forces. Many different active functions may be implemented using this principle, including switching, variable focussing, modulation, scanning and deflection.

41 Claims, 13 Drawing Figures

FIG. 1.1
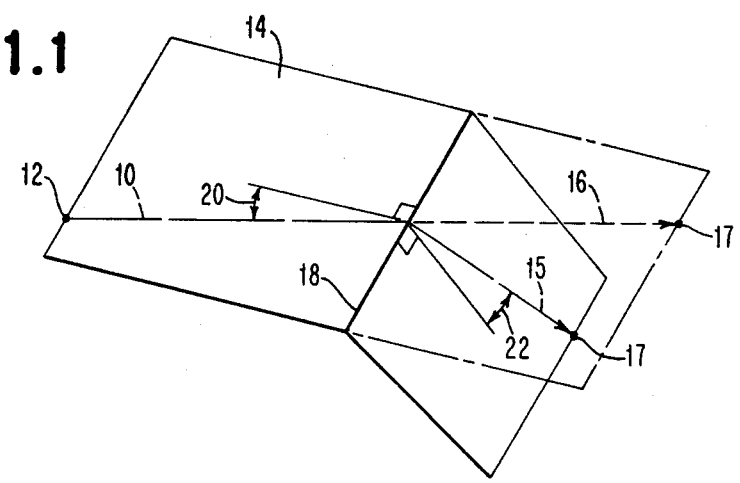
FIG. 1.2
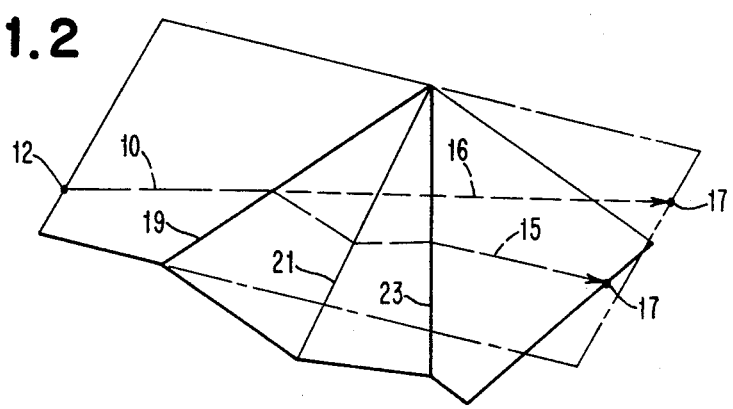
FIG. 1.3
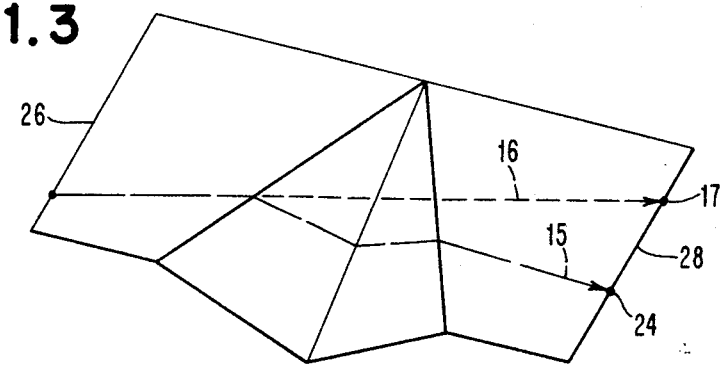

FIG. 1.4
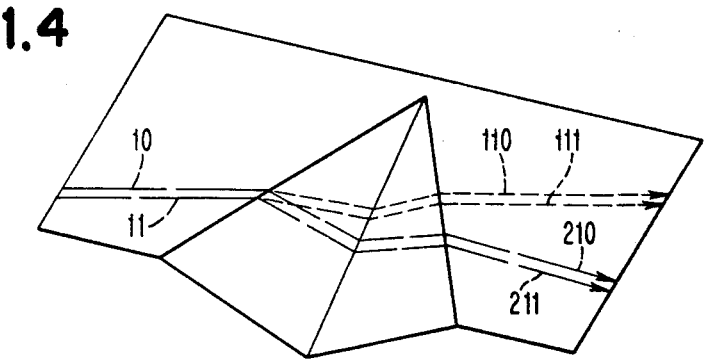
FIG. 2.1
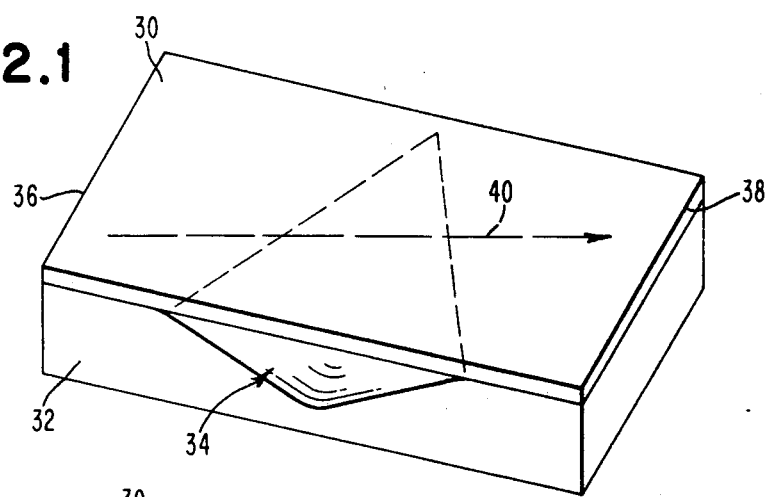
FIG. 2.2
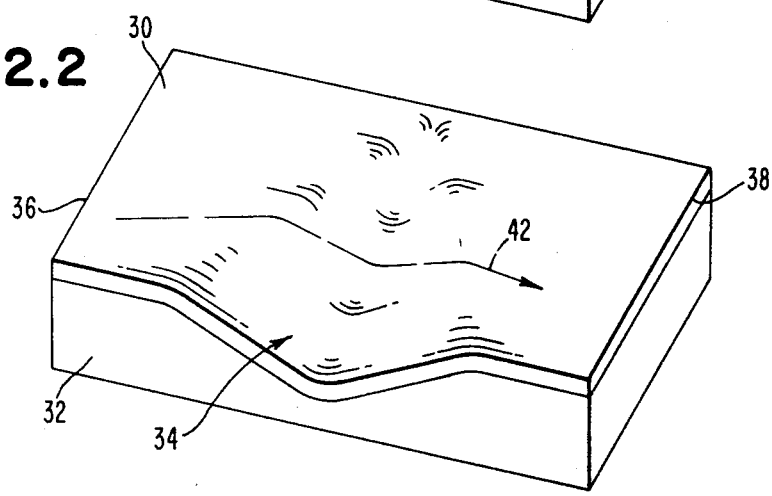

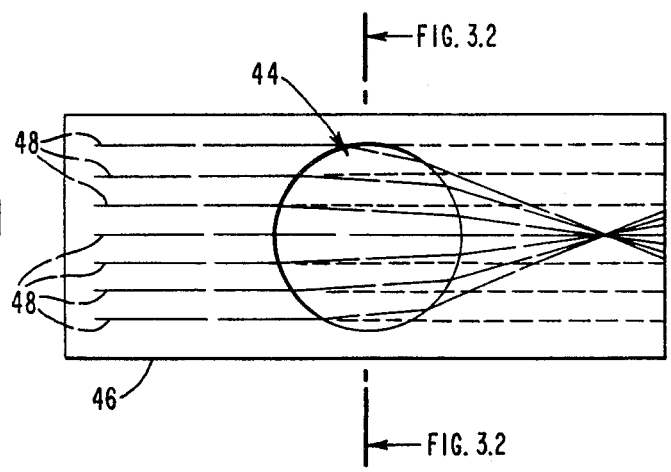
FIG. 3.1
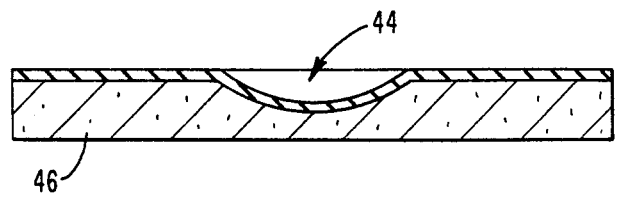
FIG. 3.2
FIG. 5
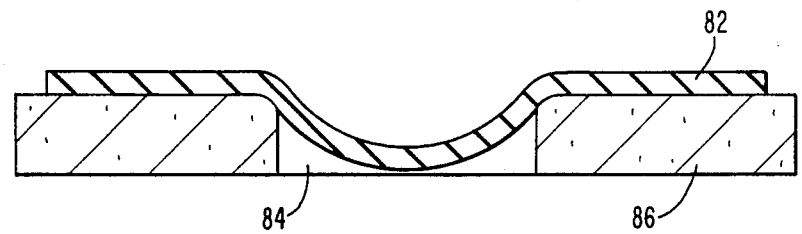

FIG. 4.1
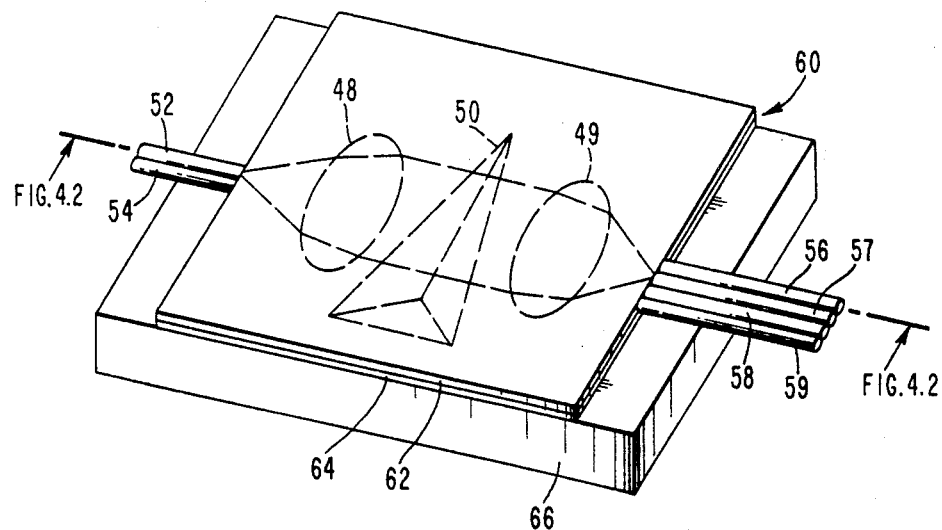
FIG. 4.2
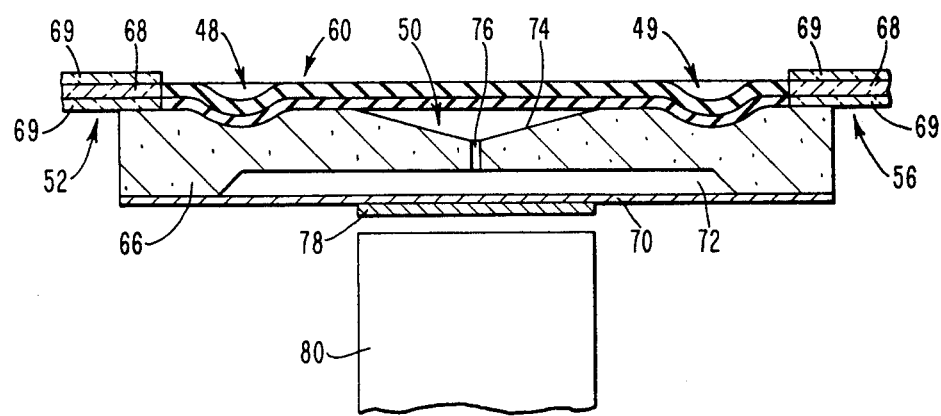

FIG. 6.1
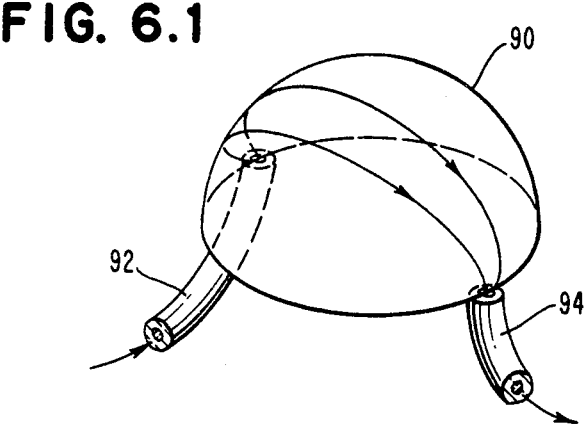
FIG. 6.2
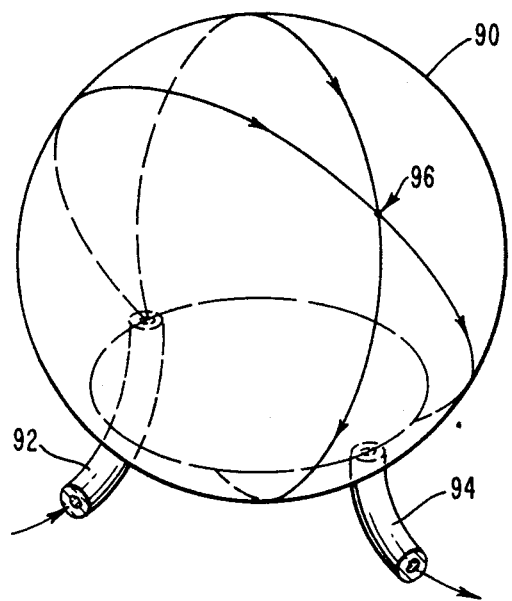

CONTROLLABLY DEFORMED ELASTIC WAVEGUIDE ELEMENTS

DESCRIPTION

1. Field of the Invention

This invention relates to active waveguide structures and particularly relates to waveguide elements which switch, deflect, scan, modulate or focus wave energy, especially light waves.

2. Background of the Invention

Active (i.e., controllable) waveguide elements are required for use in guided wave systems. The typical reason for wanting an active guided wave system is to take advantage of wave frequencies which are much higher than electronic device frequencies. Of all the types of wave energy which at present can be readily guided and manipulated, light has the highest frequency. Consequently, the chief interest in active waveguide elements is in the optical field and more specifically for integrated-optics circuits and for optical information communication systems.

Currently available, as well as experimental, state-of-the-art active and passive optical waveguide elements are reviewed, for example, by L. Teschler in "The Promise of Integrated Optics," Machine Design 143 (Dec. 6, 1979).

One method of actively manipulating light or other wave energy is by actively controlling refractive index (i.e., propagation velocity). In suitable guides this can be done by applying a controlled electric field (e.g., an electro-optic modulator) or a controlled magnetic field (e.g., a magneto-optic modulator). However, control of refractive index with an externally applied field is practical only when the wave energy is propagating in a single mode or in only a few modes. When there are many modes of propagation, the minimum physical dimension of the waveguide (thickness in the case of a planar waveguide) must be increased to support all of the modes. The field generating elements consequently must be spaced farther apart and as a result must be driven with more power. When there are many modes, the power requirements for the applied field become too high to be practical. Some devices furthermore are based upon an operational principle which inherently is limited to single mode operation (such as interferometers).

Another way of actively manipulating wave energy is by physically moving an end of a waveguide. The wave energy still travels along the same path within the waveguide but the position and/or orientation of the waveguide end is varied, thereby varying the position and/or direction of exiting wave energy. This type of element works well with multimode wave energy but the physical apparatus necessary to accurately and reliably move the end of a waveguide between two or more positions has to date required manual assembly of a plurality of individual elements, which is expensive.

Transient geometrical gratings may be produced to control light or other wave energy (e.g., an acousto-optic modulator), but gratings do not control multimode wave energy very well.

Passive structures also exist for manipulating guided wave energy, such as geodesic lenses, but functionally equivalent active structures are also needed.

It is an object of this invention to actively control the path of wave energy within a waveguide.

Another object is to actively control the path of wave energy within a waveguide without any need to change the index of refraction thereof.

Still another object is to actively control the path of wave energy through a waveguide structure without any need to physically displace the exit or entrance surfaces of any waveguide elements thereof.

A further object is to provide active waveguide elements which do not require precision manual assembly.

It is also an object to provide active waveguide elements which can be fabricated many at one time in arrays using lithographic or molding techniques.

A still further object is to provide active waveguide elements for multimode wave energy.

Another object is to provide a waveguide light focussing structure which may be actively controlled.

It is also an object to provide a lightguide switch structure.

A further object is to provide a lightguide structure which scans, modulates or deflects light.

Another object is to provide a lightguide transducer structure for converting mechanical force to a light signal without electrical power.

SUMMARY OF THE INVENTION

These and other objects are achieved by the present invention in which an elastic two dimensionally guiding waveguide is controllably stretched between two or more different configurations, the different configurations being such that wave energy takes different paths through the waveguide at each of the two or more different configurations. The paths are different because wave energy which propagates along and between two parallel boundary surfaces or which follows a surface travels along a geodesic path and the geodesic path can be changed by stretchably deforming the surface shape in a suitable manner. In one embodiment an optically transparent sheet of rubber-like material is stretched into a depression or hole within a substrate using controlled pneumatic forces. Many different active functions may be implemented using this principle, including switching, variable focussing, modulation, scanning and deflection.

BRIEF DESCRIPTION OF THE DRAWINGS

FIGS. 1.1, 1.2, 1.3 and 1.4 illustrate the principle of this invention.

FIGS. 2.1 and 2.2 show an elastic two dimensionally guiding waveguide in two different configurations and illustrate the different paths wave energy takes as a consequence.

FIG. 3.1 is an elevational view and FIG. 3.2 is a cross-sectional view of a two dimensionally guiding waveguide lens.

FIG. 4.1 illustrates an optical switch in accordance with this invention.

FIG. 4.2 is a cross-sectional view of the switch illustrated in FIG. 4.1.

FIG. 5 illustrates a variable lens structure in accordance with this invention.

FIGS. 6.1 and 6.2 schematically show a mechanical force transducer structure in accordance with this invention.

DETAILED DESCRIPTION

A two dimensionally guiding waveguide will be defined as a waveguide which confines wave energy to follow a surface or which confines wave energy to propagate along and between two substantially parallel boundary surfaces. Wave energy propagating along or through a two dimensionally guiding waveguide observes Fermat's principle, which states that the actual path of a ray is such as to make the first derivative of the effective path length equal to zero. The effective path length is a line integral along the actual path inversely weighted by the propagation speed. This means that the actual paths of rays of a propagating wave are such that the effective path lengths experienced by different rays of infinitesimal separation will be equal. When there is a variation in the propagation velocity across a wave (e.g., in U.S. Pat. No. 3,508,814 where there is a gradually varying refractive index transversely of the propagation direction) or when different parts of the wave experience an altered propagation velocity for different path distances (for example in bulk optical lenses), the rays bend to compensate therefor in such a manner that the effective path lengths experienced by adjacent rays of the wave are equal. In waveguides having uniform propagation velocity, bending of rays occurs when otherwise there would be a difference in the geometrical path length for adjacent rays of a wave.

A theoretical derivation and study of this principle has been set forth by K. S. Kunz in his article "Propagation of Microwaves between a Parallel Pair of Doubly Curved Conducting Surfaces," 25 Jour. Appl. Phys. 642 (May 1954). This principle is applied to the optics field and analyzed, for example by W. H. Southwell in "Geodesic optical waveguide lens analysis," 67 J. Opt. Soc. Am. 1293 (October 1977). It turns out that the path each ray follows is approximately a geodesic line of an imaginary surface midway between the two parallel boundary surfaces.

It is my discovery that elastic two dimensionally guiding waveguides may be dynamically distorted into two or more different configurations such that energy waves are thereby caused to take different paths and that this effect may be used to implement many desired active functions.

FIG. 1.1 illustrates the operational principle I have discovered. A guide ray 10 propagating from point 12 along a surface 14 will follow a straight line path 16, if the surface is a plane, and exit the surface at point 17. If the surface is instead folded along any straight line 18, ray 10 will propagate across the fold such that the angle of incidence 20 on one side of the fold is equal to the angle of refraction 22 on the other side of the fold, thereby following path 15. From elementary geometry it is apparent that the point at which the ray leaves the folded surface is, with respect to the surface, the same point 17 at which the ray leaves the surface when not folded.

As shown in FIG. 1.2, any number of straight line folds 19, 21, 23 can be made to the surface without changing the exit point 17 (with respect to the surface), so long as the surface is only folded and the geometrical dimensions thereof do not change.

FIG. 1.3 illustrates what happens when the input edge 26 and exit edge 28 of the surface are not permitted to change in position but folds similar to those shown in FIG. 1.2 are imposed on the surface anyway. The exit point is now shifted thereby to a new position 24 which does not correspond to the original exit point 17. It should be apparent that surface 14 must be stretched in order to so change its configuration from a flat surface configuration to a triply folded configuration. Fortunately, I have found stretchable materials with very high elastic elongation capacity which can be fabricated into waveguiding films or layers. I have found that in general stretching is required to shift the exit point. However, stretching alone is not a sufficient condition to move the exit point. The stretching must be such as to otherwise change the effective path length of adjacent rays. The rays will then bend such as to remove the effective path length variation in conformance with Fermat's principle. In FIG. 1.4 it can be readily seen that without any deflection (dotted paths 110, 111) ray 11, which is parallel to ray 10, would travel a longer distance than ray 10 because it would travel through a deeper region of the pyramidal depression. With the deflected paths 210, 211, ray 11 has a longer path through the pyramidal depression than does ray 10 but a correspondingly shorter path along the two other segments of the total path. The total path lengths are thus equal. Consequently, the rays travel as shown by the solid lines. It should be emphasized that this bending or path change occurs as a result of a change in geometry even without any change in index of refraction and without any change in propagation velocity. In a practical structure having thickness, some small change in thickness does occur as a result of stretching. Also a small change in index of refraction and consequently propagation velocity does occur. However, the effect of these changes on the propagation path is negligible in comparison to the geometrical effect.

This principle is applied to a physical structure in FIGS. 2.1 and 2.2. A waveguiding film 30 lies over a substrate 32 which contains a triangular groove 34 of gradually changing depth. Waveguide 30 is elastic and stretches across groove 34 in a rest configuration which is flat. The waveguide is affixed to the substrate such that the input edge 36 and output edge 38 cannot move. A wave propagating through the waveguide would follow a straight path 40 when the waveguide is flat as shown in FIG. 2.1. If the waveguide is stretched into contact everywhere with the surface as shown in FIG. 2.2, the wave will propagate instead along another path 42. The groove edges have been made rounded in order to reduce scattering at the groove edges. The wave has thereby been deflected or switched to a new propagation path. Deformation of the waveguide gradually between the two configurations shown will result in gradual scanning of the wave between the two propagation paths.

FIGS. 3.1 and 3.2 apply this principle to a different physical structure. The depression 44 in the substrate 46 is hemispherical in this case. When the waveguide is flat and bridges the depression, parallel rays 48 are not bent and continue over the depression and exit the waveguide still in a parallel configuration (dotted lines). However, when the elastic waveguide is stretched into contact with the spherical depression, focussing of the rays 48 occurs as shown.

BEST MODES FOR CARRYING OUT THIS INVENTION

FIGS. 4.1 and 4.2 illustrate a two-channel optical fiber switch. It comprises two geodesic lenses 48, 49, a pyramidal groove deflection structure 50, two input optical fibers 52, 54 and four output optical fibers 56, 57, 58, 59. An elastic film structure 60 comprising a top layer 62 and bottom layer 64 lies on top of a substrate 66. The cores 68 of the input and output fibers all butt against the top layer 62 of the elastic film so that light may enter the top layer 62 from either or both input fibers and exit from the top layer 62 into any one or more of the output fibers. The index of refraction of the optical fiber cores 68 is greater than the index of refraction of the cladding 69 thereof so that light will be guided along and through the fiber cores. Similarly, the top layer 62 of the elastic film has a higher index of refraction than the bottom layer 62 thereof so that the elastic film will also act as an optical waveguide. An additional elastic layer having an index lower than the index of layer 62 could be added above layer 62 if the medium above layer 62 does not have an index of refraction which is higher than the index of layer 62, or for any other reason.

Geodesic lenses 48 and 49 are shown as elliptical lenses but they may be of any other suitable shape. It is possible to make film lenses 48, 49 controllable (active) but they are here shown as fixed lenses. Lens 48 collimates light which has entered the film waveguide 60 from either or both input fibers 52, 54. The collimated light then traverses the pyramidal deflector 50 and is focussed by lens 49 onto the exit surface (edge) of the film, where it enters one or more of the output fibers.

Deflector 50 is similar to the structure shown in FIGS. 2.1 and 2.2 with the added feature that it may be remotely controlled. A gas tight elastic film 70 covers a recessed region 72 in the bottom surface of the substrate 66. A pyramidal groove 74 in the top surface of the substrate communicates through a channel 76 with the recessed region 72. Attached to the film 70 is a magnetic pad 78, which may be controllably drawn down toward solenoid 80. Film 70 is sealed to the bottom surface of substrate 66 all around the recessed region 72 so that when pad 78 is drawn towards solenoid 80, gas pressure in region 72 drops. The elastic film 60 is also gas tight and is sealed to the top surface of the substrate so that the reduced gas pressure in region 72 communicates through channel 76 and draws film 60 down and into contact with the pyramidal groove.

In the rest state (de-energized solenoid) film 60 stretches across the groove 74. The lenses are designed so that in this position light from fiber 52 becomes focussed onto the end face of fiber 57. Any light coming from fiber 54 becomes focussed onto the end face of fiber 56. When the solenoid is energized, the film 60 is stretched into contact with the pyramidal groove and the light crossing this region of altered geometry will experience a deflection, for reasons explained earlier. The amount of deflection is just sufficient so that light coming from fiber 52 now gets focussed onto the end face of fiber 59 while light coming from fiber 54 gets focussed onto the end face of fiber 58.

FIG. 5 illustrates a variable lens structure. Film 82 is an elastic waveguide stretched over an aperture 84 in a substrate 86. By pneumatic force or by any other suitable means, the elastic waveguide may be drawn into the aperture as shown. Obviously, the degree of deformation into the aperture can be controlled thus producing a focussing structure of variable power.

In FIGS. 6.1 and 6.2 a transducer structure is illustrated. A hemispherical waveguide 90 (having no thickness for ease of illustration) connects an input optical fiber 92 to an output optical fiber 94. Since light follows geodesic paths, all rays 96 coming from fiber 92 follow great circles and all become focussed upon the opposite side of the hemisphere onto the end face of the output fiber 94. If the hemispheric waveguide becomes stretched outward (as shown in FIG. 6.2) or becomes negatively stretched inward (not shown), the rays from fiber 92 will become focussed at some other point 96 (if the film remains spherical) which does not correspond with the position of the output fiber 94, or they may not become focussed at all (for a general deformation). In any event, the amount of light reaching the output fiber 94 will be severely reduced by any stretching (positively or negatively) of the hemispherical waveguide.

This principle may be used to implement a transducer. The waveguide may be stretched by gas pressure or by a mechanical arm which touches it or by a field which acts upon something attached to the waveguide. In every case, the optical output of fiber 94 will be a measure of the distortion of the hemisphere. Since light can be transmitted or guided from and to a remote location, this structure could measure or transduce gas pressure, temperature, sound, etc., at a remote location without any need for electrical power at that location.

INDUSTRIAL APPLICABILITY

This invention has greatest application in the optical field. However, the principles and structures described may be readily applied for use in any guided wave field. It may be applied for example to acoustic or particle beams and to electromagnetic radiation which is much higher (e.g., x-rays) or much lower (e.g., infrared) in frequency than the optical region in common use today.

I have found that thin film optically transparent light guides may be fabricated from various kinds of room temperature vulcanizing (RTV) methyl-siloxane silicone rubbers, such as Sylgard 182 sold by Dow Corning or RTV 602 sold by the General Electric Company. These materials are used by industry (both with and without coloring ingredients) for ceramic and glass bonding and sealing (e.g., as a bathtub sealant) as well as for cladding optical fibers.

In general there are two different effects which occur as an energy wave of finite width travels along a curved surface. The path of propagation is along geodesic lines of the surface, but adjacent geodesic lines may converge or diverge from each other. Thus, a real wave may be focussed or defocussed as it travels along a curved surface. It turns out that surfaces which do not focus or defocus belong to a particular family of surfaces called developable surfaces. A developable surface is a special ruled surface with the property that it has the same tangent plane at all points on one and the same generator. A ruled surface contains at least one one-parameter family of straight lines which can be chosen as coordinate curves on the surface. These straight lines are called generators of the ruled surface. A ruled surface may be generated by a continuous motion of a straight line in space. A further description of these terms may be found, for example, in the book *Differential Geometry* by Erwin Kreyszig (Univ. of Toronto Press 1959).

Developable surfaces are formed by combining geometrical surface parts taken from the group consisting of cones, cylinders, planes and tangential developables and joining these parts along generators. For example, a purely guiding (without focussing or defocussing) pyramidal groove could be formed from three cone parts joined along generators such that the first derivative is continuous. This resembles a pyramidal groove such as shown in FIG. 2.2 except that the edges are much more gradually rounded so that the surface is continuously curved in the groove.

Having thus described my invention, what I claim as new and desire to secure by Letters Patent is:

1. An active waveguide element, comprising:

an elastic two dimensionally guiding waveguide for propagating wave energy therethrough along a first path, said wave energy having immediately adjacent rays each experiencing the same effective propagation path lengths; and means for stretchably deforming said waveguide to a different configuration such that said adjacent rays would experience effective propagation path lengths different from each other if said wave energy were to still propagate along said first path, said wave energy propagating instead along a second different path through said waveguide when said waveguide is stretchably deformed to said different configuration such that said adjacent rays each experience the same effective propagation path length also when said wave propagates along said second path.

2. An active waveguide element as defined in claim 1 wherein said means for stretchably deforming said waveguide is controlled.

3. An active waveguide element as defined in claim 1 wherein said means for stretchably deforming said waveguide is not controlled and said waveguide element acts as a transducer.

4. An active waveguide element as defined in claim 1 which acts as a lens for guided wave energy.

5. An active waveguide element as defined in claim 1 which acts as a path switch for guided wave energy.

6. An active waveguide element as defined in claim 1 which acts as a modulator of guided wave energy.

7. An active waveguide element as defined in claim 1 which acts as a guided energy wave scanner.

8. An active waveguide element as defined in claim 1 which guides electromagnetic wave energy.

9. An active waveguide element as defined in claim 8 wherein said guided wave energy is light.

10. An active waveguide element as defined in claim 1 wherein said waveguide comprises a layer of elastic material.

11. An active waveguide element as defined in claim 10 wherein said layer is a film.

12. An active waveguide element as defined in claim 11 wherein said film is a thin-film.

13. An active waveguide element as defined in claim 1 wherein wave energy is guided by said elastic waveguide along a two-dimensional surface.

14. An active waveguide element as defined in claim 13 wherein wave energy is confined between and propagates along two parallel boundary surfaces.

15. An active waveguide element as defined in claim 13 wherein said means for stretchably deforming said waveguide stretchably deforms said two-dimensional surface between at least two different surface shapes.

16. An active waveguide element as defined in claim 15 wherein said two different surface shapes are both developable surfaces over the regions thereof traversed by wave energy.

17. An active waveguide element as defined in claim 10 wherein said layer comprises a wave energy input surface and a wave energy output surface, said input and output surfaces remaining in the same relative position with respect to each other even while said layer is stretchably deforming between two different configurations.

18. An active waveguide element as defined in claim 17 wherein said means for stretchably deforming said layer forces a region of said layer from a position not in contact with a curved surface region of a substrate adjacent thereto into a position in contact with said curved surface region of said substrate.

19. An active waveguide element as defined in claim 10 wherein said layer of elastic material has substantially uniform thickness everywhere.

20. An active waveguide element as defined in claim 1 wherein said deforming of said waveguide between two different configurations does not result in a change in propagation velocity of wave energy through said waveguide.

21. An active waveguide element as defined in claim 1 wherein said elastic waveguide comprises a transparent silicone rubber.

22. An active waveguide element as defined in claim 21 wherein said silicone rubber is a methyl-siloxane silicone rubber.

23. An active waveguide element as defined in claim 1 wherein said waveguide defines a two dimensional surface along which said wave energy propagates, said means for stretchably deforming said waveguide displacing a portion of said waveguide in a direction normal to said surface.

24. An active waveguide element as defined in claim 23 wherein said two dimensional surface is curved.

25. An active waveguide element, comprising:

an elastic two dimensionally guiding waveguide;

means for stretchably deforming said waveguide between at least two different configurations, a ray of wave energy being guided along said waveguide at substantially the same propagation velocity in any of said at least two different configurations and without substantial diffraction or scattering of said ray in any of said different configurations, said ray propagating along a first path through said waveguide when said waveguide has said first configuration and propagating along a different second path through said waveguide when said waveguide has said second configuration.

26. An active waveguide element as defined in claim 25 wherein said means for stretchably deforming said waveguide is controlled.

27. An active waveguide element as defined in claim 25 wherein said means for stretchably deforming said waveguide is not controlled and said waveguide element acts as a transducer.

28. An active waveguide element as defined in claim 25 wherein said elastic waveguide guides a plurality of rays therethrough, each along a different path and each path is changed when said waveguide is stretchably deformed to a different configuration.

29. An active waveguide element as defined in claim 28 which acts as a lens for guided wave energy.

30. An active waveguide element as defined in claim 25 which acts as a path switch for guided wave energy.

31. An active waveguide element as defined in claim 25 which guides electromagnetic wave energy.

32. An active waveguide element as defined in claim 31 wherein said guided wave energy is light.

33. An active waveguide element as defined in claim 25 wherein said waveguide comprises a layer of elastic material.

34. An active waveguide element as defined in claim 33 wherein said layer is a film.

35. An active waveguide element as defined in claim 33 wherein said means for stretchably deforming said waveguide stretchably deforms a region of said film between at least two different surface shapes.

36. An active waveguide element as defined in claim 35 wherein said two different surface shapes are both developable surfaces over the regions thereof traversed by wave energy.

37. An active waveguide element as defined in claim 35 wherein said film in said first configuration stretches across a depression in a substrate member adjacent thereto and in said second configuration is brought into contrast with said depression.

38. An active waveguide element, comprising:
an elastic two dimensionally guiding waveguide comprising a layer of elastic material; and
means for stretchably deforming said waveguide between at least two different configurations, whereby geodesic paths through said waveguide are thereby changed, said layer comprising an energy wave input surface and an energy wave output surface, said input and output surfaces remaining in the same relative position with respect to each other even while said layer is stretchably deforming between two different configurations, said means for stretchably deforming said layer forcing a region of said layer from a position not in contact with a curved surface region of a substrate adjacent thereto into a position in contact with said curved surface region of said substrate by a difference in gas pressure on opposite sides of said layer.

39. An active waveguide element, comprising:
an elastic two dimensionally guiding waveguide, comprising a film of elastic material, for guiding a ray of wave energy therethrough; and
means for stretchably deforming said waveguide between at least a first and a second configuration such that a ray traveling through said wavegide follows a first path when said waveguide is in said first configuration and follows a second path different from said first path when said waveguide is in said second configuration, said means for stretchably deforming said waveguide stretchably deforming a region of said film between at least two different surface shapes, said film in said first configuration stretching across a depression in a substrate member adjacent thereto and in said second configuration being brought into contact with said depression, said depression having a pyramidal shape.

40. An active waveguide element, comprising:
an elastic two dimensionally guiding waveguide, comprising a film of elastic material, for guiding a ray of wave energy therethrough; and
means for stretchably deforming said waveguide between at least a first and a second configuration such that a ray traveling through said wavegide follows a first path when said waveguide is in said first configuration and follows a second path different from said first path when said waveguide is in said second configuration, said means for stretchably deforming said waveguide stretchably deforming a region of said film between at least two different surface shapes, said film in said first configuration stretching across a depression in a substrate member adjacent thereto and in said second configuration being brought into contact with said depression, said depression being a combination of geometrical surface parts taken from the group consisting of cones, cylinders, planes, and tangential developables, said parts being joined along a generator.

41. An active waveguide element, comprising:
an elastic two dimensionally guiding waveguide, comprising a film of elastic material, for guiding a ray of wave energy therethrough; and
means for stretchably deforming said waveguide between at least a first and a second configuration such that a ray traveling through said waveguide follows a first path when said waveguide is in said first configuration and follows a second path different from said first path when said waveguide is in said second configuration, said means for stretchably deforming said waveguide stretchably deforming a region of said film between at least two different surface shapes, said surface shapes being both formed by combining geometrical surface parts taken from the group consisting of cones, cylinders, planes and tangential developables, said parts being joined along a generator.

* * * * *

UNITED STATES PATENT AND TRADEMARK OFFICE
CERTIFICATE OF CORRECTION

PATENT NO. : 4,294,507

DATED : October 13, 1981

INVENTOR(S) : Mark Johnson

It is certified that error appears in the above-identified patent and that said Letters Patent are hereby corrected as shown below:

Column 9, line 9, "contrast" should read --contact--.

Column 9, line 34, "wavegide" should read --waveguide--.

Column 10, line 9, "wavegide" should read --waveguide--.

Signed and Sealed this

Twenty-ninth Day of October 1985

[SEAL]

Attest:

DONALD J. QUIGG

Attesting Officer

Commissioner of Patents and
Trademarks—Designate